Mannin & Booth.
Lantern.
No. 295. Reissued Jan. 30. 1855.
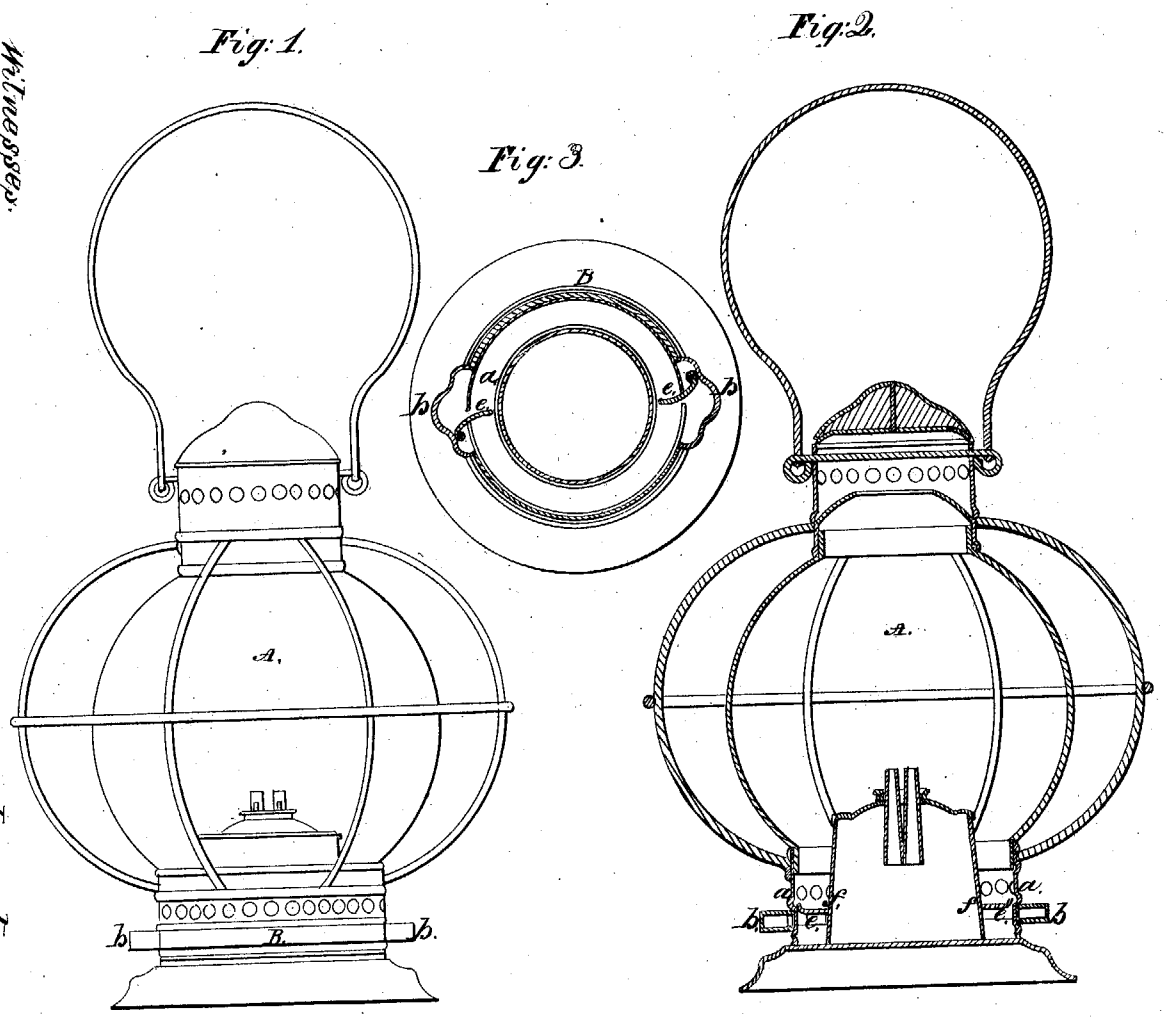
Witnesses.
John B. Fairbank
Thos. P. Howe
Inventors.
Charles Mannin
Wm. M. Booth.
N. PETERS, PHOTO-LITHOGRAPHER, WASHINGTON, D. C.

UNITED STATES PATENT OFFICE.

CHARLES MONNIN AND WILLIAM M. BOOTH, OF BUFFALO, NEW YORK.

IMPROVEMENT IN FASTENING LANTERNS.

Specification forming part of Letters Patent No. 11,437, dated August 1, 1854; Reissue No. 295, dated January 30, 1855.

*To all whom it may concern:*

Be it known that we, CHARLES MONNIN and WILLIAM M. BOOTH, of Buffalo, in the county of Erie and State of New York, have invented certain Improvements in Lanterns, which improvements are set forth and described in the following specification and accompanying drawings with sufficient clearness to enable others of competent skill to make and use our invention.

Our invention consists in attaching the lamp to the body of the lantern by means of the combination of certain flanges or their equivalents with catches which are hinged to a ring or equivalent device, by the motion of which the hinges of the catches are moved concentric or parallel, or nearly so, to a flange or its equivalent, through which the catches slide in such a manner as to engage with a flange upon the other part of the lantern, as hereinafter described.

In the accompanying drawings, Figure 1 is an outside elevation, Fig. 2 is a sectional elevation, and Fig. 3 is a sectional plan, of a lantern which embodies and illustrates the principles of our invention.

A designates the body of the lantern. *a* designates a flange which forms part of said body. B is a cylindrical ring, which has two boxes or chambers, *b*, upon it, forming a part of it, which chambers contain the catches *e*, hinged at one end to said chamber. These catches pass through the flange *a*, as shown in Fig. 3, and under the flange *f*, which forms a part of the lamp, as shown in Fig. 2. The parts are shown in the position which they occupy when the lamp is attached to the lantern. It may be disengaged by rotating the ring B against the urn. It will be seen by a slight examination of this arrangement that this arrangement of the catches in combination with the flanges secures a greater inward travel to the catches, and consequently a more secure attachment of the lamp to the lantern, than is obtainable by the old methods of construction. It is also obvious that the form of construction may be greatly varied without changing the principle of the combination or altering the *modus operandi* of its essential parts.

We claim—

Attaching the lamp to the lantern by means of the combination of the catches *e* with the flanges *a* and *f* and the ring to which the catches are hinged, or its equivalent, the purpose and object of the ring being to give the hinged ends of the catches a motion concentric or parallel, or nearly so, to the side of the lantern or the flange through which the catches pass.

CHARLES MONNIN.
WM. M. BOOTH.

Witnesses:
THOS. P. HOW,
JOHN B. FAIRBANK.